US012643063B1

(12) United States Patent
Sunkara et al.

(10) Patent No.: US 12,643,063 B1
(45) Date of Patent: Jun. 2, 2026

(54) NON-PASSIVE ANTI-VIRAL AND NANOFILTER BASED RESPIRATORS

(71) Applicants: University of Louisville Research Foundation, Inc., Louisville, KY (US); ADEM Technologies Inc, Louisville, KY (US)

(72) Inventors: Mahendra Sunkara, Louisville, KY (US); Arjun Thapa, Louisville, KY (US); Theodore Druffel, Louisville, KY (US); Edward C Tackett, Louisville, KY (US); Vivekanand Kumar, Louisville, KY (US); Lukus Guhy, Louisville, KY (US); Tu Nguyen, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 1017 days.

(21) Appl. No.: 17/229,757

(22) Filed: Apr. 13, 2021

Related U.S. Application Data

(60) Provisional application No. 63/010,477, filed on Apr. 15, 2020.

(51) Int. Cl.
 *B01D 39/16* (2006.01)
 *A62B 7/10* (2006.01)
 (Continued)

(52) U.S. Cl.
 CPC ............ *B01D 39/1623* (2013.01); *A62B 7/10* (2013.01); *A62B 23/025* (2013.01); *B32B 5/022* (2013.01); *B32B 5/268* (2021.05); *B32B 5/271* (2021.05); *B01D 2239/025* (2013.01);

*B01D 2239/0442* (2013.01); *B01D 2239/0464* (2013.01); *B01D 2239/0478* (2013.01); *B01D 2239/0613* (2013.01); *B01D 2239/0618* (2013.01); *B01D 2239/0622* (2013.01);
(Continued)

(58) Field of Classification Search
 CPC .................................................. B01D 39/1623
 See application file for complete search history.

(56) References Cited

U.S. PATENT DOCUMENTS

| | | | |
|---|---|---|---|
| 4,801,494 | A | 1/1989 | Datta et al. |
| 7,625,576 | B2 | 12/2009 | Moskovitz et al. |
| 7,727,931 | B2 | 6/2010 | Brey et al. |
| 8,227,360 | B2 | 7/2012 | Takashima et al. |

(Continued)

*Primary Examiner* — Robert Clemente
(74) *Attorney, Agent, or Firm* — ALGM LLP; Harry J. Guttman

(57) ABSTRACT

The present development is a nanofilter, i.e. a filter material that comprises inorganic nanowires impregnated into a non-woven polymer or cloth fabric material. The nanofilter comprises a fabric infiltrated with a nanowire powder slurry selected from anatase titania ($TiO_2$), zinc oxide (ZnO), silica, tin oxide, alumina ($Al_2O_3$), or combinations thereof. Exemplary fabrics include a non-woven polymer and a cotton fabric cloth. The nanowire powder slurry effectively produces a coating on the fabric. Optionally, the nanowires may be functionalized using nanoparticles and/or disinfecting salt particles. The infiltrated nanowires form a porous network with sub-micron scale openings and provide filtration of any airborne particles, liquid droplets and viruses including COVID 19. The nanofilter may be used in a variety of applications, such as a nanofilter respirator as described herein.

24 Claims, 2 Drawing Sheets

(51) Int. Cl.

| | |
|---|---|
| *A62B 23/02* | (2006.01) |
| *B32B 5/02* | (2006.01) |
| *B32B 5/26* | (2006.01) |

(52) U.S. Cl.

CPC .................. *B01D 2239/065* (2013.01); *B01D 2239/1225* (2013.01); *B01D 2239/1233* (2013.01); *B01D 2239/1258* (2013.01); *B01D 2239/1291* (2013.01); *B32B 2255/02* (2013.01); *B32B 2255/20* (2013.01); *B32B 2260/021* (2013.01); *B32B 2260/046* (2013.01); *B32B 2262/0253* (2013.01); *B32B 2262/0276* (2013.01); *B32B 2262/105* (2013.01); *B32B 2262/14* (2013.01); *B32B 2264/104* (2013.01); *B32B 2264/1051* (2020.08); *B32B 2264/1055* (2020.08); *B32B 2264/301* (2020.08); *B32B 2307/7145* (2013.01); *B32B 2307/72* (2013.01); *B32B 2307/724* (2013.01); *B32B 2307/73* (2013.01); *B32B 2571/00* (2013.01)

(56) References Cited

U.S. PATENT DOCUMENTS

| | | | |
|---|---|---|---|
| 9,046,468 | B2 | 6/2015 | Wang et al. |
| 9,421,294 | B2 | 8/2016 | Yamada et al. |
| 10,201,198 | B2 | 2/2019 | Tong et al. |
| 10,271,385 | B2 | 4/2019 | Unalan et al. |
| 2004/0127614 | A1 | 7/2004 | Jiang et al. |
| 2005/0205484 | A1* | 9/2005 | Diel ...................... B01D 29/15 |
| | | | 210/323.1 |
| 2006/0064956 | A1* | 3/2006 | Connor .............. B01D 46/0002 |
| | | | 55/495 |
| 2008/0118539 | A1 | 5/2008 | McDow et al. |
| 2013/0091611 | A1 | 4/2013 | Ren et al. |
| 2014/0205642 | A1 | 7/2014 | Ballard et al. |
| 2018/0080148 | A1* | 3/2018 | Westerhoff ......... B01J 20/28083 |
| 2019/0209728 | A1 | 7/2019 | Maa et al. |
| 2020/0238111 | A1 | 7/2020 | O et al. |
| 2020/0318283 | A1 | 10/2020 | Uddin et al. |
| 2020/0355378 | A1* | 11/2020 | Jeong ................... B01D 46/645 |
| 2021/0029992 | A1 | 2/2021 | Skiba et al. |
| 2021/0068479 | A1 | 3/2021 | Han |

* cited by examiner

10

—— 20 firm polyester

—— 22 thin polypropylene (optional)

—— 24 nanowire-impregnated MERV filter

—— 26 uncoated MERV filter

—— 28 non-woven fiber (optional)

—— 30 thin polypropylene

NON-PASSIVE ANTI-VIRAL AND NANOFILTER BASED RESPIRATORS

CROSS-REFERENCE TO PRIOR APPLICATIONS

The present application claims priority to U.S. Patent Application 63/010,477 filed 2020 Apr. 15, which is incorporated by reference in its entirety.

GOVERNMENT INTEREST

This invention was made without any government support.

FIELD OF THE INVENTION

The invention relates to non-passive anti-viral and nanofilter based respirators.

BACKGROUND OF THE INVENTION

Respirators are personal protective equipment that are used to protect the wearer from airborne particles and from liquid contaminating the face. Respirators known commercially as N95 respirators effectively filter 95% of airborne particles. The Centers for Disease Control and Prevention (CDC), National Institute for Occupational Safety and Health (NIOSH) and Occupational Safety and Health Administration (OSHA) also regulate N95 respirators.

Current N95 respirators rely on an electrostatic charge on polymer fiber cloth to attract the airborne particles. NaCl certification aerosols have been used to demonstrate that N95 respirators are at least 95% efficient for filtration of the most penetrating particle size, defined as 0.1 micron to 0.3 micron. However, the N95 respirators are not very effective with liquid droplets (or moisture), do not offer any disinfection capabilities, and have limited re-use capabilities. These factors limit the value of the N95 respirator, particularly against the COVID-19 virus.

A variety of methods to make nanofilters for limiting the transmission of airborne particles have been reported. An exemplary method uses polymeric nanofibers (electrospun or otherwise produced) to produce coatings on cloths. The thickness of these nanofibers and density of packing can produce filters capable of stopping sub-micron particles while allowing air to flow through the filter. Other methods use high surface are carbon filters as adsorption media to disinfect odors and filter out particles.

The present development is a relatively simple manufacturing method that can be used with readily available commercial non-woven polymer fabrics to produce a nanofilter capable of providing protection against the COVID-19 virus. The method is scalable for manufacturing large quantities of fabrics and respirators.

SUMMARY OF THE PRESENT INVENTION

The present development is a nanofilter, i.e. a filter material that comprises inorganic nanowires impregnated into a non-woven polymer or non-woven fabric or cloth fabric material. The nanofilter may be used in a variety of applications, such as a nanofilter respirator as described herein.

The nanofilter comprises a fabric infiltrated with a nanowire powder slurry comprising selected binders and solvents. Exemplary fabrics include a non-woven polymer or a cotton fabric cloth. The nanowire powder slurry effectively produces a coating on the fabric. In a preferred embodiment, the fabric has at least one coating of inorganic nanowires. Optionally, the nanowires may be functionalized using nanoparticles and/or disinfecting salt particles. The infiltrated nanowires form a porous network with sub-micron scale openings and provide filtration of any airborne particles, liquid droplets and viruses including COVID 19.

BRIEF DESCRIPTION OF THE FIGURES

FIG. 2 is a schematic for an assembly process for making the mask of FIG. 1; and, FIGS. 3(a) and 3(b) are SEM images of a $TiO_2$ nanowire-impregnated MERV 15 material with a nanowire film loading of between 20 $g/m^2$ and 50 $g/m^2$, wherein

DETAILED DESCRIPTION OF THE PRESENT DEVELOPMENT

Figure 1:
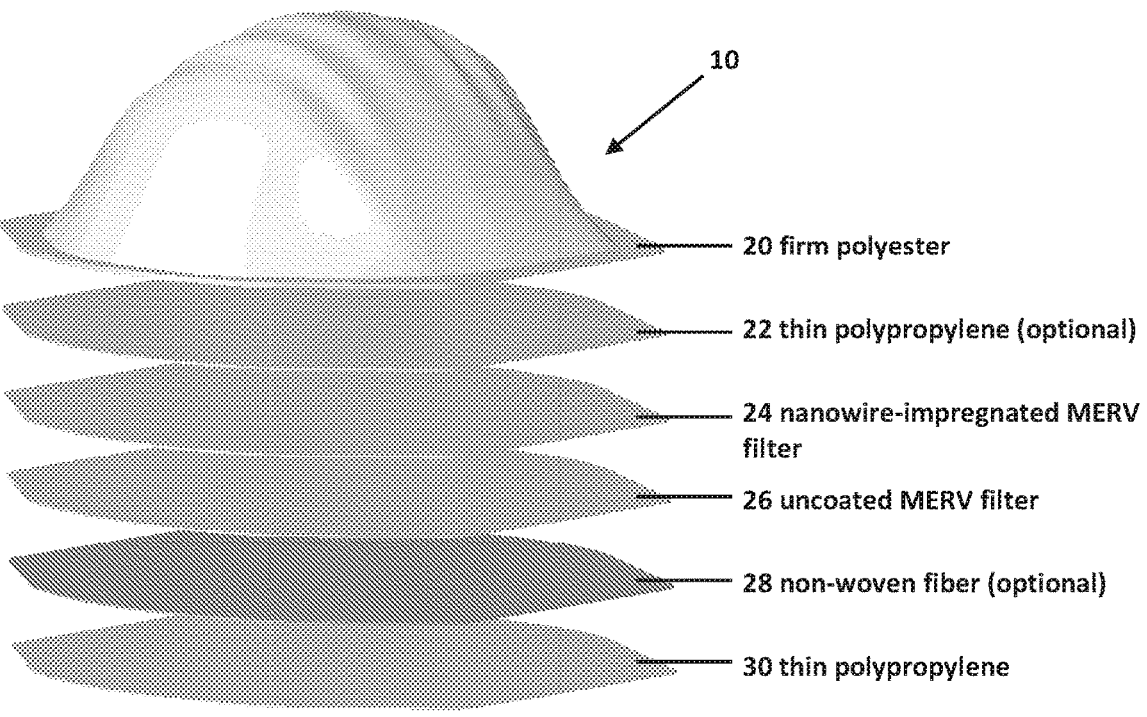
FIG. 1 is a schematic of fabric layers for mask assembly, as shown from top to bottom: firm polyester, thin polypropylene, nanowire impregnated MERV filter, MERV filter, non-woven fiber, thin polypropylene.

The following description is intended to provide the reader with a better understanding of the invention. The description is not intended to be limiting with respect to any element not otherwise limited within the claims. For example, the present invention will be described in the context of use with a commonly known respirator or face mask, but the nanofilter of the present invention may be used in any application that requires filtration of micron-sized particulates.

The present development is a nanofilter, i.e., a filter material that comprises inorganic nanowires impregnated into a substrate, wherein the substrate is a non-woven polymer material or a non-woven fabric or a woven cloth material. Nanowires are generally known in the art. For this application, the nanowires for use in the nanofilter comprise titania ($TiO_2$), zinc oxide (ZnO), silica, tin oxide, alumina ($Al_2O_3$), or combinations thereof. In a preferred embodiment, the nanowires comprise titania or zinc oxide. The nanowires define a diameter and a length. For the present application, the nanowires must have dimensions that deliver the nanowires in a powder form, i.e., the nanowires have a diameter ranging from about 10 nm to about 200 nm, and a length ranging from about 1 micron to about 100 microns. In a preferred embodiment, the nanowire length is from about 5 microns to about 30 microns. In a more preferred embodiment, the nanowire length is from about 5 microns to about 20 microns.

Optionally, the nanowires can be functionalized with a disinfectant before application to the substrate. Exemplary disinfectants include sodium hypochlorite or curcumin. In an exemplary embodiment, the disinfectants are added to comprise about 5 wt % of the dry nanowire powder. However, the exact amount of disinfectant used will be dependent on the nanowire, the substrate, the particular disinfectant, and the intended nanofilter application. Without being bound by theory, it is believed that the titania nanowire materials and the zinc oxide nanowire materials are capable of absorbing UV radiation which, when done in the presence of a water molecule, produces a free radical that can aid in destroying organic pathogens. Optionally, the nanowires can be decorated with silver nanoparticles or copper nanoparticles. In an exemplary embodiment, the silver nanoparticles are added to comprise about 5 wt % of the dry nanowire powder. In an optional exemplary embodiment, the copper nanoparticles are added to comprise from about 5 nm to about 20 nm of the dry nanowire powder. However, the exact amount of silver nanoparticles or copper nanoparticles used will be dependent on the nanowire, substrate, disinfectant, and the intended nanofilter application. When a nanowire is decorated with a nanoparticle, the nanoparticle remains on the surface of the nanowire. The use of silver nanoparticles aids with UV disinfection.

The substrate may be any non-woven polymer material or non-woven fabric or woven cloth material that can be used for filtration. In a preferred embodiment, the substrate is any material that is categorized as an MERV 13 or higher material, wherein MERV refers to the minimum efficiency reporting value, or any material that has a density of from about 15 g/m² to about 50 g/m² (also referred to as about 15 gsm to about 50 gsm). Exemplary substrates include polypropylene melt-blown non-woven materials, polyester non-woven materials, polyester polycarbonate non-woven materials, melt-blown non-woven filtration media materials, cotton fabric, cotton twill, tightly woven linen, cotton interlock, and combinations thereof.

The nanofilter is prepared by impregnating the nanowires into the substrate. A slurry of nanowire powder is prepared by mixing the nanowire powder with a polymer binder, such as polyvinylidene difluoride (PVDF) or poly (tetrafluoroethylene) binder (PTFE), and then dispersing the nanowire-binder mixture in water or an organic solvent to produce a slurry with a concentration of from about 5 wt % solids to about 40 wt % solids, and more preferably a slurry with a concentration of from about 5 wt % solids to about 20 wt % solids. In a preferred embodiment, the binder comprises from about 3 wt % to about 30 wt % of the nanowires. Water based solvents are preferred. However, organic solvents, such as ethanol, isopropyl alcohol, or N-methylpyrrolidone (NMP), assist with PVDF and PTFE dispersion and may increase the solvent evaporation rates, leading to more uniform layers. The slurry is then coated onto the substrate by means known in that art. Examples of methods for slurry coating include, but are not limited to, knife coating, slot die coating, gravure coating, spray deposition, dip coating, spray and vacuum filtration. Further as is known in the art, coating thickness, solids loading and porosity is maintained by controlling the slurry composition and deposition parameters. In a preferred embodiment, the nanowire film loading on the non-woven polymer material is from about 1 mg/cm² to about 52 mg/cm². In a more preferred embodiment, the nanowire film loading on the non-woven polymer material is from about 1 mg/cm² to about 20 mg/cm². In a most preferred embodiment, the nanowire film loading on the non-woven polymer material is from about 2 mg/cm² to about 4 mg/cm².

The slurry coated substrate is then dried to produce the nanofilter. In a preferred embodiment, the material is dried at about 150° C. to about 200° C. Drying time will vary depending on the nanowire film, the substrate and the nanowire film loading on the substrate. Optionally, the drying process may further include ultraviolet (UV) radiation of the coated materials. The UV radiation provides initial disinfection to the materials.

When the slurry coated substrate is dried, it has been found that the nanowire film impregnates, or goes into, the substrate to form the nanofilter rather than forming a separate coating layer on the substrate. This creates nanosize pores in the nanofilter throughout the substrate, which are believed to effect filtration by mechanical means. Because the nanofilter functionality is not reliant on electrostatic charge, and because the nanowires are impregnated within the substrate, the nanofilter is washable for up to at least 20 cycles in a detergent solution.

Figure 3A:
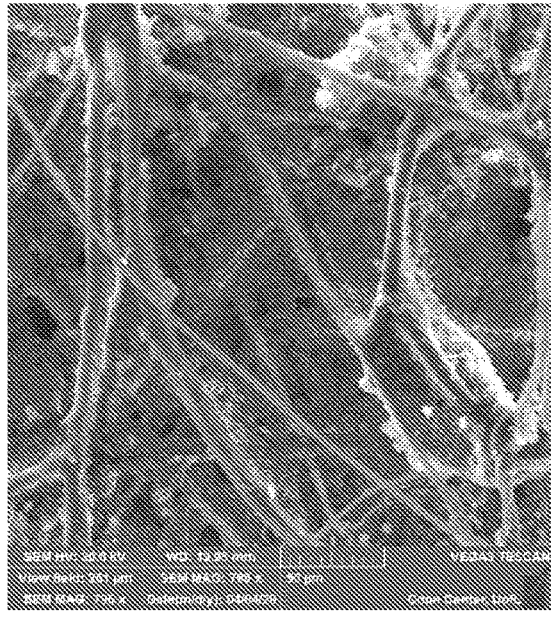
FIG. 3(a) is magnified at 796× and FIG. 3(b) is magnified at 1.55 kx.
Figure 3A:
Figure 3B:

The following exemplary embodiment is provided to give the reader a better understanding of the development and is not intended to be limiting with respect to any element not otherwise limited within the claims. In the exemplary embodiment, a mixture comprising 90 wt % titania nanowires and 10 wt % PVDF binder is dispersed in water to deliver a slurry with a solids concentration between 10 wt % and 30 wt %. Each slurry is coated onto a MERV 15 polypropylene non-woven material. FIG. 3 is a pair of SEM images (FIG. 3(a) and FIG. 3(b)) at different magnifications showing that the coating loads uniformly and the porosity control through the loading amount. Table 1 summarizes the nanowire loading on the non-woven material using each slurry.

TABLE 1

| Solution wt % | Thickness, um | TiO2: PVDF | Actual loading, g/m² |
|---|---|---|---|
| 10% | 10 | 90:10 | 20.1 |
| 15% | 10 | 90:10 | 24.6 |
| 20% | 10 | 90:10 | 34.1 |
| 30% | 10 | 90:10 | 52.3 |

The nanofilter of the present invention is capable of filtering at least 95% of air-borne particulates having a particle size of from about 0.1 micron to about 0.3 micron. In addition, the nanofilter is effective for providing filtration of liquid droplets and viruses, including COVID 19.

In a first example, nanofilters were prepared using 2.0+/−0.5 mg/cm² titania nanowire loading on a 50 gsm melt-blown non-woven substrate. When exposed to a 0.075 micron particle source, the unwashed uncoated substrate demonstrated a filtration efficiency of greater than 95%, but after one detergent wash cycle the filtration efficiency dropped to less than 85%. By contrast, when the nanofilter was exposed to a 0.075 micron particle source, the unwashed nanofilter demonstrated a filtration efficiency of greater than 95%, and the filtration efficiency remained greater than 95% after one detergent wash cycle and after five detergent wash cycles. In a second example, nanofilters were prepared using 3.0+/−1.0 mg/cm² titania nanowire loading on a 35 gsm non-woven polypropylene substrate. When exposed to a 0.075 micron particle source, the unwashed uncoated substrate demonstrated a filtration efficiency of greater than 95%, but after one detergent wash cycle the filtration efficiency dropped to less than 84%. By contrast, when the nanofilter was exposed to a 0.075 micron particle source, the unwashed nanofilter demonstrated a filtration efficiency of greater than 95%, and the filtration efficiency remained greater than 95% after ten detergent wash cycles. In a third example, nanofilters were prepared using about 4 mg/cm² titania nanowire loading on a 50 gsm meltblown polypropylene substrate. SEM imaging shows that greater than 3 mg/cm² nanowires are still impregnated within the substrate after 20 detergent wash cycles. For each of the above examples, the mask or nanofilter was washed for about one minute in warm water (~60° C.) with commercially available household-grade laundry detergent, then rinsed with running tap water to remove any detergent residue, and then dried using circulating hot or room temperature air for about 15-30 minutes.

The nanofilter of the present invention can be used in a respirator or face mask or similar personal protective equipment (PPE). As shown in FIG. 1, the respirator or mask 10 comprises a plurality of material layers bound together and molded into a predetermined shape. In an exemplary embodiment, the respirator comprises an exterior material 20, such as a firm polyester layer, bonded to an optional polymer layer 22, such as a thin polypropylene layer, bonded to the nanofilter layer 24 which is bonded to an uncoated substrate layer 26, such as a layer of uncoated MERV filter material, which is bonded to an optional non-woven fabric layer 28 which is bonded to an interior polymer layer 30, such as a thin polypropylene layer.

The respirator or mask 10 is prepared by providing a nanofilter as described supra and then layering the nanofilter with additional predetermined material layers, such as shown in FIG. 1, to form a filter material. The filter material is formed into a predetermined shape by steam forming or steam heat stamping. Various shapes as are known in the art can be used, such as a face mask that covers the nose and mouth. After steam forming, the filter material is impulse sealed along the edges. Optionally, ear loops or straps may be stapled onto the sealed shaped filter material. The sealed shaped filter material is then sterilized and ready for use.

Figure 2:
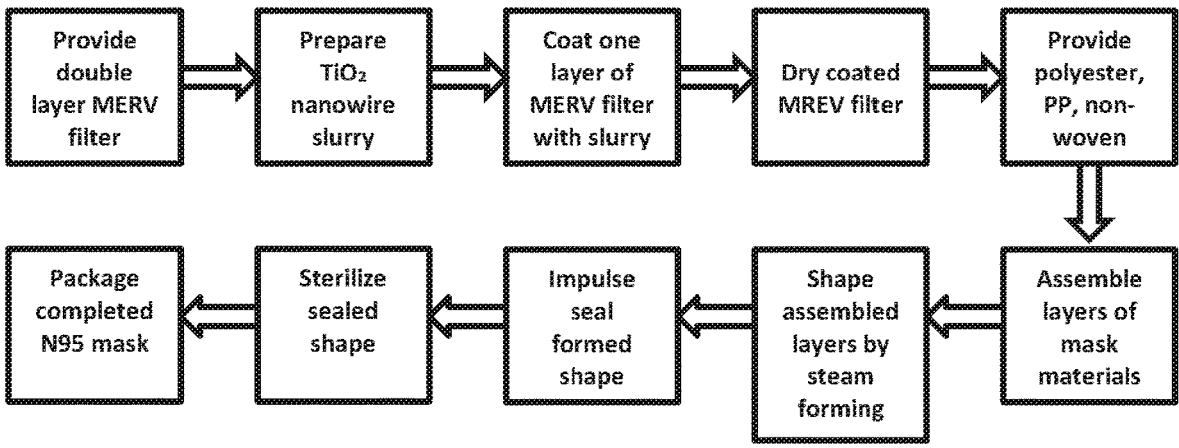

In an exemplary embodiment, the respirator or mask 10 of FIG. 1 is prepared by a multi-step process as shown in FIG. 2. Initially, a double layer MERV 15 filter material is obtained. A 20 wt % slurry comprising 90:10 titanium dioxide nanowire: PVDF in a water solvent is prepared. The nanowire slurry is used to coat one layer of the MERV filter with a 10 micron thick coating. The coated MERV filter is then dried to produce a nanofilter with a nanowire film loading of about 34 mg/cm$^2$. Sheets or layers of a firm polyester material and a spunbond polypropylene is obtained. The uncoated MERV filter layer and the nanofilter are combined with the polymer sheets and are assembled to form a stacked layer in the order: firm polyester/nanofilter/ MERV filter/thin polypropylene. The stacked layers are shaped into a predetermined shape, such as the nose and mouth covering mask shown in FIG. 1, by steam forming. The formed shape is impulse sealed, and then the impulse sealed formed shape is sterilized to produce an N95 mask. Optionally, the firm polyester material or the outer thin polypropylene layer or both may be treated to make the material hydrophobic.

The sterilized filter material has a rating of at least an N95 by NIOSH standards for air-borne particles. Airflow measurements with masks made from the composite material show a slight pressure increase at a high flow rate, e.g. several tens of liters/min, and a very low increase in pressure drop at low flows, as are necessary for respirator applications. The nanowires impregnated into the non-woven polymer material creates a ceramic nanofilter, so when used as a face mask or respirator, the respirator does not require an exhale flap to avoid moisture build-up which can cause problems with the current N95 electrostatic charge respirators.

As noted supra, the titania nanowires, the zinc oxide nanowires, and the decorating silver particles absorb UV radiation. This property allows the composition material of the present invention to be simply and reliably disinfected using a moderate to low energy UV light source. Optionally, the composite materials are water and detergent stable, so they can be washed and re-used. Optionally, fragrance can be added to the nanowire impregnated materials in the coating stage using essential oils.

Although combined with specific material layers herein to form a composite material for an N95 respirator, the nanofilter material described herein may be used with other combinations of materials to produce a filtering composite or may be used as a replacement filter in a hard mask. Beyond application as a respirator, the nanofilter based polymer fabric can also find applications in water and chemical separation applications.

Unless defined otherwise, all technical and scientific terms used herein have the same meaning as commonly understood by one of ordinary skill in the art to which the presently disclosed subject matter pertains. Representative methods, devices, and materials are described herein, but are not intended to be limiting unless so noted.

The terms "a", "an", and "the" refer to "one or more" when used in the subject specification, including the claims. The term "ambient temperature" as used herein refers to an environmental temperature of from about 0° F. to about 120° F., inclusive.

Unless otherwise indicated, all numbers expressing quantities of components, conditions, and otherwise used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, or percentage can encompass variations of, in some embodiments ±20%, in some embodiments ±10%, in some embodiments ±5%, in some embodiments ±1%, in some embodiments ±0.5%, and in some embodiments to ±0.1%, from the specified amount, as such variations are appropriate in the disclosed application.

All compositional percentages used herein are presented on a "by weight" basis, unless designated otherwise.

It is understood that, in light of a reading of the foregoing description, those with ordinary skill in the art will be able to make changes and modifications to the present invention without departing from the spirit or scope of the invention, as defined herein. For example, those skilled in the art may substitute materials supplied by different manufacturers than specified herein without altering the scope of the present invention.

What is claimed is:

1. A nanofilter for filtering air or liquid comprising inorganic nanowires impregnated into a substrate, wherein (a) the inorganic nanowires comprise titania (TiO$_2$), zinc oxide (ZnO), silica, tin oxide, alumina (Al$_2$O$_3$), or combinations thereof, (b) the substrate is suitable for air or liquid filtration, (c) the substrate comprises a non-woven polymer material, a non-woven fabric, or a woven cloth material, and (d) the nanowires are functionalized with disinfectant, nanoparticles, or a combination thereof.

2. The nanofilter of claim 1, wherein the nanowires have a diameter ranging from about 10 nm to about 200 nm, and a length ranging from about 1 micron to about 100 microns.

3. The nanofilter of claim 1, wherein the nanowire length is from about 5 microns to about 20 microns.

4. The nanofilter of claim 1, wherein the nanowires are functionalized with sodium hypochlorite, curcumin, silver nanoparticles, copper nanoparticles, or a combination thereof.

5. The nanofilter of claim 1, wherein the nanowires are mixed with a polymer binder comprising polyvinylidene difluoride or poly (tetrafluoroethylene) binder.

6. The nanofilter of claim 1, wherein the substrate is selected from a material that is categorized as an MERV 13 or higher material or a material that has a density of from about 15 gsm to about 50 gsm.

7. The nanofilter of claim 1, wherein the substrate comprises a polypropylene melt-blown non-woven material, a polyester non-woven material, a polyester polycarbonate nonwoven material, a melt-blown non-woven filtration media material, a cotton fabric, a cotton twill fabric, a tightly woven linen fabric, a cotton interlock fabric, or a combination thereof.

8. The nanofilter of claim 1, wherein the nanowire film loading on the non-woven polymer material is from about 1 $mg/cm^2$ to about 52 $mg/cm^2$.

9. The nanofilter of claim 1, wherein the nanowire film loading on the non-woven polymer material is from about 1 $mg/cm^2$ to about 20 $mg/cm^2$.

10. The nanofilter of claim 1, wherein the nanowire film loading on the non-woven polymer material is from about 2 $mg/cm^2$ to about 4 $mg/cm^2$.

11. The nanofilter of claim 1, wherein the nanofilter is disinfected using ultraviolet radiation.

12. A respirator or face mask comprising the nanofilter of claim 1.

13. The respirator of claim 12, further comprising an exterior material, an uncoated substrate layer, and a second polymer layer.

14. The respirator of claim 13, further comprising a first polymer layer, a nonwoven fiber layer, or a combination thereof.

15. The respirator of claim 13, wherein the exterior material is a firm polyester, the nano filter is a MERV 13 or higher filter material or a material that has a density of from about 15 gsm to about 50 gsm impregnated with titania or zinc oxide, the uncoated substrate layer is an uncoated MERV 13 or higher filter material or material that has a density of from about 15 gsm to about 50 gsm, and the second polymer layer is a thin polypropylene, wherein the layers are stacked in the order: firm polyester/nanofilter/MERV filter/thin polypropylene.

16. The respirator of claim 14, wherein the first polymer layer is a thin polypropylene, and the non-woven fabric layer comprises polypropylene melt-blown non-woven materials, polyester non-woven materials, polyester polycarbonate non-woven materials, melt-blown non-woven filtration media materials, cotton fabric, cotton twill, tightly woven linen, cotton interlock, or a combination thereof.

17. The respirator of claim 13, wherein the exterior material or the second polymer layer or both are treated to make the materials hydrophobic.

18. The respirator of claim 13, wherein the stacked layers are formed into a predetermined shape by steam forming or steam heat stamping, and then are impulse sealed along the edges.

19. The respirator of claim 13, wherein the respirator has a rating of at least an N95 by NIOSH standards for air-borne particles.

20. The nanofilter of claim 1, wherein the inorganic nanowires comprise zinc oxide (ZnO), silica, tin oxide, alumina ($Al_2O_3$), or a combination thereof.

21. The nanofilter of claim 1, wherein the filtration efficiency when exposed to 0.075 micron particles, is greater than 95% after five detergent wash cycles,
   wherein a single detergent wash cycle is a one-minute wash in approximately 60° C. water with commercially available household-grade laundry detergent, followed rinsing with running tap water to remove any detergent residue, and then followed by drying using circulating hot or room temperature air for about 15-30 minutes.

22. The nanofilter of claim 1, wherein the filtration efficiency when exposed to 0.075 micron particles, is greater than 95% after twenty detergent wash cycles,
   wherein a single detergent wash cycle is a one-minute wash in approximately 60° C. water with commercially available household-grade laundry detergent, followed rinsing with running tap water to remove any detergent residue, and then followed by drying using circulating hot or room temperature air for about 15-30 minutes.

23. The nanofilter of claim 1, wherein the nanofilter is for filtering air and the substrate is suitable for air filtration.

24. A nanofilter for filtering air or liquid comprising inorganic nanowires impregnated into a substrate, wherein (a) the inorganic nanowires comprise titania ($TiO_2$), zinc oxide (ZnO), silica, tin oxide, alumina ($Al_2O_3$), or combinations thereof, (b) the substrate is suitable for air or liquid filtration, and (c) the substrate comprises a polypropylene melt-blown non-woven material, a polyester non-woven material, a polyester polycarbonate nonwoven material, a melt-blown non-woven filtration media material, a cotton fabric, a cotton twill fabric, a tightly woven linen fabric, a cotton interlock fabric, or a combination thereof.

* * * * *